United States Patent Office 3,485,874
Patented Dec. 23, 1969

3,485,874
ORTHO AND PARA BROMOPHENYL ISOPROPYL METHYLAMINES
Zoltan Ecsery, József Knoll, Ildiko Kosa, Ildiko Sandor, Eva Somfai and Sandor Torok, Budapest, Hungary, assignors to Chinoin Gyogyszer es Vegyeszeti Termekek Byara RT
No Drawing. Filed May 4, 1966, Ser. No. 547,446
Int. Cl. C07c 87/28; A61k 27/00
U.S. Cl. 260—570.8                2 Claims

ABSTRACT OF THE DISCLOSURE

Ortho or para bromophenyl isopropyl methylamine which have important pharmacological activity as coronary dilators, hallucinogenic agents, depressive agents, tranquilizers, analgesics and for weight reduction.

DETAILED DESCRIPTION

This invention relates to ortho or para bromophenyl isopropyl methylamine which is useful as coronary dilators, hallucinogenic, depressive agents, tranquilizers, analgesic agents, and for weight reduction.

The compounds in this invention exhibit a 10–20 times stronger hallucinogenic effect than mescaline and exert a depressive and analgesic effect identical with that of Tetrabenazine. A further advantage of the compounds according to the present invention resides in the fact that the side-effects of the enumerated known drugs have not been observed (e.g. the danger of getting accustomed to the drug, as by codeine).

The compound substituted in the ortho-position exhibits a strong and durable coronary dilatory effect.

A further feature of the present invention provides pharmaceutical compositions comprising compounds of this invention or acid addition salts thereof, formed with pharmaceutically acceptable acid, as active ingredient, in admixture with suitable pharmaceutical carriers or excipients. The compositions may be finished in solid (tablets, pills, coated pills, suppositories) or in liquid form (solutions, emulsions) and may contain additives, carriers, sliding and filling agents, etc. used in pharmacy. The finishing of the pharmaceutical compositions is carried out by procedures of pharmaceutical industry known per se. The compositions may also contain further therapeutically active ingredients, such as analgetics, sedatives, spasmolytics, diuretics, blood pressure decreasing, antiinflammatory and coronary-flow increasing agents. Further details of our process are to be found in the examples.

EXAMPLE 1

200 ml. of water are poured while stirring and cooling into 295 ml. of concentrated sulfuric acid, whereupon cooling and stirring are continued and 435 g. of phenyl-isopropyl-methylamine are added. 330 ml. of a 100% nitric acid are added in a period of about 2 hours so that the temperature should not exceed 30–35° C. The mixture is stirred at 35–30° C. for 2–3 hours, whereupon it is poured into 5 l. of ice-water and made alkaline with about 2.5 l. of a 40% sodium hydroxide solution. The mixture is extracted with benzene and the layers separated. The aqueous phase is then extracted twice with benzene. The eventually formed emulsion may be removed by filtration. The united benzene extract is dried over anhydrous sodium sulfate, filtered and evaporated. The residual brown oil is subjected to distillation in a high vacuo, whereupon phenyl-isopropyl-methylamine ($n_D^{20}=1.5086$) is obtained at 55–57° C./0.3 Hg mm. The product may be used by further production.

Nitro-phenyl-isopropyl-methylamine is obtained by a temperature of 110–120° C./0.4 Hg mm.; $n_D^{20}=1.5420$.

The distillation residue may be used by the preparation of the hydrochloride and consists of the relatively pure para isomer. The nitro-phenyl-isopropyl-methylamine thus obtained is dissolved in anhydrous ethanol (the ethanol is used in a volume being equal with the weight of the nitro-derivative), and acidified with anhydrous ethanol containing 20–30% of hydrochloric acid. In order to promote crystallisation, the solution is seeded with p-nitro-phenyl-isopropyl-methylamine - hydrochloride crystals or the wall of the flask is scratched. The solution is allowed to crystallize at room temperature for 4–5 hours, than at 0–5° C. for 10 hours, filtered, the crystals are washed with cooled (0° C.) anhydrous ethanol three times, and dried. Thus p-nitro-phenyl-isopropyl-methylamine-hydrochloride is obtained in the form of crystals shrinking at 178° C. and melting at 186–188° C.

On recrystallizing three times from a 5-fold amount of anhydrous ethanol spectroscopically pure p-nitro-phenyl-isopropyl-methylamine is obtained. M.P.: 194–196° C. Analysis: N, percent=12.13 (calc.: 12.15), Cl, percent=13.62 (calc.: 13.32).

The mother-lye of p-nitro-phenyl - isopropyl - methyl-amine-hydrochloride is evaporated and the residue is dissolved in a 5-fold volume of water. If no clear solution is obtained, it is then extracted with benzene twice, the aqueous layer is made alkaline and the base is extracted with benzene, as described by the working-up of the reaction mixture obtained by nitrating. The united benzene solutions are dried over potassium carbonate and concentrated. The residue is fractionated on an effective column in vacuo. The boiling point of o-nitro-phenyl-isopropyl-methylamine is by 3–4° C. lower than that of the para-isomer, consequently it distills off mainly in the first fractions.

Samples are drawn from the individual fractions, which are acidified by means of drop-wise addition of anhydrous ethanol. The fraction, the sample of which does not provide a crystalline precipitation, may be considered as the ortho-isomer and is subjected to further fractionating, to yield entirely pure o-nitro-phenyl-isopropyl-methylamine.

Fraction No. 1

By 99–110° C./0.25 Hg mm., $n_D^{20}=1.5423$. On addition of ethanol containing hydrochloric acid no precipitation is observed.

Fraction No. 2

By 100–111° C./0.3 Hg mm., $n_D^{20}=1.5430$. On addition of ethanol containing hydrochloric acid no precipitation is observed.

Fraction No. 3

By 111–114° C./0.3 Hg mm., $n_D^{20}=1.5469$. On addition of ethanol containing hydrochloric acid no precipitation is observed.

Fraction No. 4

By 114.5–117.5/0.2 Hg mm., $n_D^{20}=1.5513$. On addition of ethanol containing hydrochloric acid a crystalline product precipitates.

Fraction Nos. 1, 2, 3 are united and fractionated in vacuo as described above. If the first fractionation has been correctly carried out, by the second fractionation the losses amount only to about 3–5% and on addition of ethanol containing hydrochloric acid no precipitation is observed by the fractions. The fractions contain however a product of decomposition, formed by distillation, which is not soluble in aqueous hydrochloric acid.

The o-nitro-phenyl-isopropyl-methylamine thus obtained is therefore dissolved in a 10% aqueous hydrochloric acid solution and extracted twice with benzene.

(The benzene layer contains the impurity). The aqueous phase is made alkaline, extracted with benzene, whereupon the benzene layer is dried and evaporated to yield pure o-nitro-phenyl-isopropyl-methylamine.

The crystalline hydrochloride of the base may be formed by the aid of ethanol containing hydrochloric acid, in ethyl acetate as medium. The product is recrystallized from ethyl acetate containing 10% of anhydrous ethanol several times. M.P.: 129–131° C.

*Analysis.*—N, percent=12.14 (calc.: 12.15); Cl, percent=15.03 (calc.: 15.2).

The melting point of the hydrobromide amounts to 110–112° C.

*Analysis.*—N, percent=10.06 (calc.: 10.1); Br, percent=26.93 (calc.: 29).

p-Nitro-phenyl-isopropyl-methylamine-hydrochloride exhibits a typical effect on cats, which is characteristic of psychomimetica. Within half an hour after administration of 10–30 mg./kg. doses of the product, mydriasis of maximal strength and within about an hour a characteristic central excitatory state is developed by the animals, which is characterized by the fact that the cat gets into a catatonic state, does not move or change position, but on external stimulant attacks shows a "shame-rage" reaction of maximal strength. The cat snorts furiously and said state lasts for some hours. After 12 hours the above state passes, but the reaction may be induced by further administration of p-nitro-phenyl-isopropyl-methylamine. The reaction is not inhibited by the administration of a 10 mg./kg. dose of chlorpromazine. The acute peroral toxicity of the product amounts to 180 mg./kg. on rats. The product is about 20 times more effective than mescaline. The product decreases in doses of 2, 10 and 36 mg./kg. the motility of mice by 38.8, 56 and 68% when tested with a photoelectric motimeter. The compound exhibits after 30 minutes of the administration of 5 and 10 mg./kg. doses an analgesic effect of 63 and 70%, if tested by means of the contact thermal method. The product induces in doses of 30 mg./kg. a metabolism increase of 114% (if tested according to the method of Issekutz).

The o-nitro-phenyl-isopropylamine hydrochloride shows the central effects of methamphetamine at most in a slight extent. It does not exhibit a motility-increasing effect, moreover in doses of 20–30 mg./kg. it inhibits the spontaneous motility of the animals. The product exerts an acute psychostimulant effect, because if administered in the dose of 10 mg./kg. it fully antagonizes the depressive effect of a 10 mg./kg. dose of Tetrabenazine. The product increases metabolism and reduces blood pressure; the later blood pressure reducing effect may be observed in a dose of 8.2 mg./kg. The product inhibits the blood pressure increasing effect of actedron.

EXAMPLE 2

46.53 g. of o-nitro-phenylisopropyl-methylamine are dissolved in 730 ml. of anhydrous ethanol, whereupon the solution is acidified with about 100 ml. of anhydrous ethanol containing hydrochloric acid and is hydrogenated in the presence of 5.53 g. of a palladium-charcoal catalyst, 16 normal l. of hydrogen are adsorbed. The catalyst is filtered off, washed with ethanol, whereupon the filtrate is evaporated, the residue is dissolved in 300 ml. of water and made alkaline. The oil thus obtained is extracted with benzene three times, whereupon the benzene solution is dried over anhydrous potassium carbonate and concentrated. The residue is distilled off in vacuo; thus by 114–116° C./0.3 Hg mm. o-amino-phenyl-isopropyl-methylamine base is obtained in the form of a colourless oil; $n_D^{20}=1.5552$.

EXAMPLE 3

58.10 g. of p-nitro-phenyl-isopropyl-methylamine-hydrochloride are dissolved in 875 ml. of anhydrous ethanol, whereupon the solution is hydrogenated in the presence of 5.8 g. of a palladium-charcoal catalyst, 17 normal l. of hydrogen are adsorbed. The reaction mixture is worked up according to the method described by the preparation of o-amino-phenyl-isopropyl-methylamine. Thus by 117–118° C./0.3 Hg mm. p-amino-phenyl-isopropyl-methylamine is obtained; $n_D^{20}=1.5608$.

The dihydrochloride of the product melts by 251–256° C.

*Analysis.*—N, percent=11.76 (calc.: 11.83); Cl, percent=29.9 (calc.: 30.3).

The product antagonizes the effect of a 10 mg./kg. dose of Tetrabenazine in a dose of 25 mg./kg.; it does not exhibit motility increasing effect and raises blood pressure in doses of 2.5, 5 and 10 mg./kg. by 44, 64 and 82 Hg mm. on narcotized cats.

EXAMPLE 4

8.21 g. (0.05 mole) of p-amino-phenyl-isopropyl-methylamine base are dissolved in a mixture of 13.6 ml. of concentrated hydrochloric acid and 46 ml. of water, whereupon 15 g. of ice are added and an aqueous solution of 3.45 g. (0.05 mole) of sodium nitrite and 8 ml. of water are added dropwise at a temperature below 5° C. During the addition the pH of the reaction mixture should amount to the value of 1. After the addition having been completed, the reaction mixture is stirred for 0.5 hour, whereupon the presence of free nitrous acid is checked by means of a filter-paper strip, wetted by a potassium iodide-starch solution. If the reaction is negative and no free nitrous acid is found, a sodium nitrite solution is added, until the reaction becomes positive.

12.45 g. of cupric sulfate and 12.45 g. of sodium chloride are dissolved in 49.8 ml. of water and $SO_2$-gas (developed from sodium sulfite and hydrochloric acid) is led into the solution, until the colour thereof becomes dark grey. The introduction of the gas is continued for 10 minutes, whereupon the excess of $SO_2$ is evaporated and the reaction mixture is allowed to cool to 20–25° C. The diazotised p-aminophenyl-isopropyl-methylamine solution is poured into the above solution and the mixture is allowed to stand for an hour, whereupon it is heated on a water bath at 95–100° C. for an hour. The mixture is allowed to cool to a temperature of 20–25° C., whereupon it is extracted with benzene, made alkaline with ammonia and afterwards with a 40% sodium hydroxide solution, the alkaline solution is extracted with 4× 100 ml. portions of benzene, whereupon the benzene extract is dried over anhydrous potassium carbonate and the solvent is distilled off. The residual dark brown oil is fractionated in vacuo. A forerun is obtained by 75–76° C./0.2 Hg mm. ($n_D^{20}=1.556$), while the main fraction distills off by 76.5° C. ($n_D^{20}=1.5258$).

The main fraction thus obtained is acidified with ethanol containing hydrochloric acid, whereupon ether is added until the solution becomes turbid. The mixture is crystallized at 0° C. for 10 hours, whereupon the precipitated crystals are filtered, washed with a chilled (0° C.) 1:1 mixture of ethanol and ether and dried. Thus p-chloro-phenyl-isopropyl-methylamine-hydrochloride is obtained; M.P. 136–139° C.

*Analysis.*—N, percent=6.24 (calc.: 6.39), Cl, percent=32.72 (calc.: 32.16), Cl, percent=16.50 (calc.: 16.08).

EXAMPLE 5

The preparation of o-chloro-phenyl-isopropyl-methylamine is carried out exactly according to the method described in the previous example.

Using the same amount of starting material, 17.42 g. of the crude base are obtained, from which 7.8 g. of distilled o-chloro-phenyl-isopropyl-methylamine base are obtain; $n_D^{20}=1.5284$. The hydrochloric acid salt of the base may be obtained by means of acidifying with ethanol containing hydrochloric acid. M.P.: 144–149° C.

The hydrochloride may be recrystallized from a 11-fold volume of anhydrous ethylacetate containing 10% of anhydrous ethanol. M.P.: 151–152° C.

*Analysis.*—C, percent=53.13 (calc.: 54.6), H, percent=6.93 (calc.: 6.81), N, percent=6.39 (calc.: 6.39), Cl, percent=31.8 (calc. 32.16), Cl, percent=15.8 (calc.: 16.08).

EXAMPLE 6

9.8 g. of p-amino-phenyl-isopropyl-methylamine are dissolved in a mixture of 28.8 ml. of 48.8% hydrobromic acid and 54 ml. of water, whereupon a solution of 4.2 g. of sodium-nitrite and 24 ml. of water are added dropwise at a temperature below 0° C. The mixture is stirred at this temperature for 0.5 hour, whereupon a sample thereof is poured on a filter-paper strip wetted with a potassium iodide-starch solution. If the strip does not become blue, a solution of 0.2 g. of sodium nitrite in 1 ml. of water is added. During the diazotizing reaction the pH of the reaction mixture should amount to the value of 1.

10.8 g. of cupric sulfate are dissolved in 92 ml. of water, the solution thus obtained is united with a solution of 10.8 g. of potassium bromide and 25 ml. of water, whereupon 39.6 ml. of 48% hydrobromic acid and 32 g. of copper powder are added and the mixture is heated while shaking at 90–100° C. for 1 hour. The reaction mixture is cooled to 20–25° C., whereupon the diazotized solution is slowly added. After standing for an hour the mixture is heated at 90–100° C. for an hour. The further working up of the reaction mixture is carried out according to the method described by the preparation of p-chlorophenyl-isopropyl-methylamine. The distilled base is obtained at 81–83° C./0.2 Hg mm.; $n_D^{20}=1.5454$.

The distilled base is acidified with a 48% hydrobromic acid solution while cooling at a temperature below 50° C., the precipitated crystals are filtered off, disintegrated, dried in vacuo and crystallized from anhydrous ethanol. M.P.: 156–158° C.

The p-bromo-phenyl - isopropyl-methylamine - hydrobromide exhibits a similar effect to the p-nitrophenyl-isopropyl-methylamine hydrochloride, but contrary to the nitro derivative, the bromo compound does not influence the spontaneous motility of the animals. The metabolism increasing effect of the product is three times, while its analgesic effect is four times stronger than that of the p-nitro-derivative.

EXAMPLE 7

The o-bromo-phenyl-isopropyl-methylamine is prepared from o-amino-phenyl-isopropyl-methylamine in an analogous way as the para-isomer. The boiling point of distilled o-bromo-phenyl-isopropyl-methylamine base amounts to 72–76° C./O. 1 Hg mm.; $n_D^{20}=1.5452$.

The melting point of the hydrobromide on recrystallizing 3 times from a 20-fold amount of ethylacetate containing 20% of anhydrous ethanol, amounts to 174–175° C.

*Analysis.*—N, percent=4.25 (calc.: 4.54), Br, percent=52.4 (calc.: 51.8), Br, percent=26.0 (calc.: 25.9).

The product exhibits a blood pressure decreasing effect of 50% (related to the original blood pressure) in a dose of $ED_{50}=6.3$ mg./kg. on narcotized cats.

The product increases coronary flow in 1 mg./kg. doses by 56, 38 and 30% 2, 10 and 30 minutes after administration on dogs. Coronary circulation was studied on dogs, giving heroine and pre-treated with 1 mg./kg. of morphine. The animals were narcotized by 30 mg./kg. doses of Evipan-Na and kept on artificial respiration.

EXAMPLE 8

16.4 g. (0.1 mole) of p-amino-phenyl-isopropyl-methylamine are dissolved in a mixture of 16.8 ml. of concentrated sulfuric acid and 100 ml. of water; 30 g. of ice are added, whereupon a solution of 8 g. of sodium nitrite and 16 ml. of water is added dropwise, while cooling at a temperature below 0° C. During the reaction the pH of the mixture should amount to the value of 1 and at the end of the reaction the mixture should give a positive nitrous acid reaction with a filterpaper strip wetted with a potassium iodide-starch solution.

25 g. of cupric sulfate pentahydrate and 71.2 g. of potassium iodide are dissolved in 100 ml. of water, whereupon $SO_2$ gas is introduced into the solution. A white substance precipitates. The excess of the gas is evaporated, the mixture is cooled to room-temperature, a mixture of 17 ml. of concentrated sulfuric acid and 110 ml. of water are added and the solution of the diazonium salt is slowly poured in. Further on one proceeds as described in Example 4 by the preparation of p-chloro-phenyl-isopropyl-methylamine. Thus p-iodo-phenyl-isopropyl-methylamine-hydrochloride is obtained. M.P.: 177–178° C.

*Analysis.*—C, percent=38.85 (calc.: 38.6), H, percent=4.92 (calc.: 4.84), Cl, percent=11.38 (calc.: 11.40).

EXAMPLE 9 o-Iodo-phenyl-isopropyl-methylamine is prepared according to a method analogous to the preparation of the paraisomer (see Example 8). The boiling point of the base amounts to 85–86° C.; $n_D^{20}=1.5744$. The hydrochloride melts at 145.5–146.5° C.

*Analysis.*—Cl, percent=11.58 (calc.: 11.4).

EXAMPLE 10

10.77 g. of p-nitro-phenyl-isopropyl-methylamine are dissolved in 13 ml. of anhydrous toluene, whereupon 3.31 g. of propargyl-bromide are added dropwise during about 10 minutes. The temperature of the mixture from 26° C. rises to 37° C. The reaction mixture is stirred at 60° C. for 3 hours, whereupon it is cooled; 14 ml. of a 30% sodium-hydroxide solution are added and the mixture is allowed to mix for 5–10 minutes. Thereafter 10.29 g. of chloro-formic-acid-ethyl-ester are added during 10 minutes while cooling, so that the temperature should not exceed 50° C. The reaction mixture is stirred at 50–60° C. for half an hour, whereupon it is cooled to room-temperature and the layers are separated in a separating funnel. The aqueous phase is drained off, whereupon the toluene layer is extracted with 5–8 ml. portions of a 10% hydrochloric acid solution until the acidic extract gives no precipitation, if made alkaline. The hydrochloric acid extracts are made alkaline, the precipitated oil is extracted with benzene, whereupon the benzene solution is dried, evaporated and the residue converted into the hydrochloride by means of ethanol containing hydrochloric acid. M.P.: 161–164° C.

On recrystallizing five times from ethylacetate containing 10% anhydrous ethanol pure p-nitro-phenyl-isopropyl-methyl-propinyl-amine hydrochloride is obtained. M.P.: 164–166° C.

*Analysis.*—N, percent=10.56 (calc.: 10.45), Cl, percent=12.75 (calc.: 13.23).

The product exhibits psychostimulant effect, however without possessing the acute excitatory properties being characteristic of phenyl-isopropylamine. The product paralyses the monoamino-oxydaze, decreases blood pressure and stimulates metabolism.

EXAMPLE 11

20 g. of p-bromo-phenyl-isopropylamine-base are dissolved in 25 ml. of anhydrous toluene, whereupon 3.45 ml. of propargyl-bromide are added dropwise while stirring at a temperature below 50° C. The reaction mixture is heated to 80° C., stirred for 2 hours, whereupon it is cooled to room-temperature and extracted with a 5% hydrochloric acid solution, until on making the hydrochloric acid extract alkaline, no precipitate falls out. The hydrochloric acid extracts are united, made alkaline with sodium-hydroxide, the precipitated oil is extracted with benzene, whereupon the benzene layer is dried over potassium carbonate and evaporated. The residue is subjected to fractionating in vacuo. As forerun p-bromophenyl-isopropylamine is obtained at 74–80° C./0.1 Hg mm., $n_D^{20}$=1.5471.

The main fraction consists of p-bromo-phenyl-isopropyl-methyl-propinylamine, boiling point: 95–102° C./0.1 Hg mm., $n_D^{20}$=1.5502.

The hydrobromide is prepared from the base with hydrobromic acid and the crude product is crystallized from ethyl-acetate containing anhydrous ethanol. M.P.: 167–168° C.

*Analysis.*—C, percent=45.13 (calc.: 45), H, percent= 4.98 (calc.: 4.92), Br, percent=23.5 (calc.: 23).

EXAMPLE 12

8.8 g. of o-bromo-phenyl-isopropyl-methylamine base are dissolved in 11 ml. of toluene, whereupon 1.53 g. of propargyl-bromide are added dropwise and the mixture is stirred at 80° C. for an hour. 5.95 ml. of triethylamine are added and stirring at 80° C. is continued for 15 minutes. After having added dropwise 1.53 ml. of propargyl-bromide, the reaction mixture is stirred at 80° C. for 2 hours, whereupon it is cooled and the toluene layer is extracted with 5% hydrochloric acid until on making the hydrochloric acid extract alkaline, no precipitation is observed. The united hydrochloric acid extracts are made alkaline, the oil obtained is extracted with benzene, whereupon the benzene solution is dried and evaporated. To the residue 9.5 ml. of benzoyl chloride and 66 ml. of a 10% aqueous sodium-hydroxide solution are added dropwise, simultaneously, while stirring at a temperature below 50° C. The reaction mixture is stirred at 50° C. for an hour, whereupon it is extracted with benzene and the benzene solution is extracted with a 5% hydrochloric acid until on making the acidic solution alkaline, no precipitation is observed. The hydrochloric acid extract is made alkaline, the oil obtained is extracted with benzene, the benzene solution is dried over potassium carbonate and evaporated in vacuo. The residue is distilled off under reduced pressure. At 110° C./0.15 Hg mm. o-bromo-phenyl-isopropyl-methyl-propinylamine is obtained, $n_D^{20}$=1.5525.

The hydrobromide is obtained from a mixture of ethanol and ether. The melting point of said salt amounts to 97° C. (decomposition), while shrinkage takes place at 89° C.

*Analysis.*—N, percent=4.2 (calc.: 4.05), Br, percent =23.1 (calc.: 23).

What we claim is:
1. o-Bromo-phenyl isopropyl methylamine.
2. p-Bromo-phenyl isopropyl methylamine.

References Cited

UNITED STATES PATENTS

| 3,253,037 | 5/1966 | Huebner | 260—570.8 X |
| 3,198,833 | 8/1965 | Beregi et al. | 260—570.8 |

FOREIGN PATENTS

| 767,186 | 1/1952 | Germany. |
| 767,161 | 12/1951 | Germany. |
| 1,368,136 | 6/1964 | France. |

OTHER REFERENCES

Cavallini et al., "Chemical Abstracts," vol. 53, pages 19929–30. Patrick et al. "Jour. Amer. Chem. Soc." vol. 68, pages 1009–11 (1946). Patrick et al. "Jour. Amer. Chem. Soc," vol. 68, pages 1153–5 (1946).

ROBERT V. HINES, Primary Examiner

U.S. Cl. X.R.

260—141; 424—330